United States Patent
Ohlsson et al.

(10) Patent No.: US 11,620,612 B2
(45) Date of Patent: Apr. 4, 2023

(54) SYSTEMS AND METHODS FOR INVENTORY MANAGEMENT AND OPTIMIZATION

(71) Applicant: C3.AI, Inc., Redwood City, CA (US)

(72) Inventors: Henrik Ohlsson, Palo Alto, CA (US); Gowtham Bellala, Redwood City, CA (US); Sina Khoshfetrat Pakazad, Redwood City, CA (US); Dibyajyoti Banerjee, Santa Clara, CA (US); Nikhil Krishnan, San Carlos, CA (US)

(73) Assignee: C3.AI, Inc., Redwood City, CA (US)

( * ) Notice: Subject to any disclaimer, the term of this patent is extended or adjusted under 35 U.S.C. 154(b) by 0 days.

(21) Appl. No.: 16/506,672

(22) Filed: Jul. 9, 2019

(65) Prior Publication Data

US 2020/0143313 A1    May 7, 2020

Related U.S. Application Data

(60) Provisional application No. 62/754,466, filed on Nov. 1, 2018.

(51) Int. Cl.
*G06N 20/00*     (2019.01)
*G06Q 10/087*    (2023.01)

(52) U.S. Cl.
CPC .......... *G06Q 10/087* (2013.01); *G06N 20/00* (2019.01)

(58) Field of Classification Search
CPC .. G06Q 10/06; G06Q 10/0637; G06Q 10/063; G06Q 20/203; G06N 20/00; G06N 7/005; G06N 3/08; G06N 5/003
See application file for complete search history.

(56) References Cited

U.S. PATENT DOCUMENTS 5,287,267 A     2/1994   Jayaraman et al.
7,117,130 B1 *  10/2006  Megiddo .............. G05B 13/024
                                               703/2

(Continued)

FOREIGN PATENT DOCUMENTS

WO     WO-2014097011 A  *  6/2014

OTHER PUBLICATIONS

Mousavi, Optimizing a location allocation-inventory problem in a two-echelon supply chain network, Jun. 11, 2015, Computers and Industrial Engineering 87 (2015) 543-560. (Year: 2015).*

(Continued)

*Primary Examiner* — Florian M Zeender
*Assistant Examiner* — Milena Racic

(57) ABSTRACT

The present disclosure provides systems and methods that may advantageously apply machine learning to accurately manage and predict inventory variables with future uncertainty. In an aspect, the present disclosure provides a system that can receive an inventory dataset comprising a plurality of inventory variables that indicate at least historical (i) inventory levels, (ii) inventory holding costs, (iii) supplier orders, and/or (iv) lead times over time. The plurality of inventory variables can be characterized by having one or more future uncertainty levels. The system can process the inventory dataset using a trained machine learning model to generate a prediction of the plurality inventory variables. The system can provide the processed inventory dataset to an optimization algorithm. The optimization algorithm can be used to predict a target inventory level for optimizing an inventory holding cost. The optimization algorithm can comprise one or more constraint conditions.

60 Claims, 7 Drawing Sheets

(56) References Cited

U.S. PATENT DOCUMENTS

| | | | | |
|---|---|---|---|---|
| 7,398,232 | B2* | 7/2008 | Renz | G06Q 10/06 |
| | | | | 705/28 |
| 7,499,766 | B2* | 3/2009 | Knight | G06Q 10/087 |
| | | | | 700/107 |
| 11,176,589 | B2* | 11/2021 | Pyati | G06N 20/00 |
| 11,321,650 | B2* | 5/2022 | Anandan Kartha | |
| | | | | G06Q 10/06315 |
| 2003/0225635 | A1 | 12/2003 | Renz et al. | |
| 2006/0235557 | A1 | 10/2006 | Knight et al. | |
| 2014/0031966 | A1* | 1/2014 | Cheng | G06Q 10/0631 |
| | | | | 700/107 |
| 2016/0328734 | A1* | 11/2016 | Lederman | G06Q 30/0223 |
| 2018/0012166 | A1* | 1/2018 | Devadas | G06Q 10/06315 |
| 2018/0268330 | A1* | 9/2018 | Konanur | G06Q 10/0631 |
| 2018/0285902 | A1 | 10/2018 | Nazarian et al. | |
| 2019/0080277 | A1* | 3/2019 | Trivelpiece | G06V 30/194 |
| 2020/0034701 | A1* | 1/2020 | Ritter | G06N 3/0454 |

OTHER PUBLICATIONS

Ettl et al. A Supply Network Model with Base-Stock Control and Service Requirements. Operations Research 48(2):216-232 (Mar.-Apr. 2000). DOI: https://doi.org/10.1287/opre.48.2.216.12376.

Tsiakis et al. Design of Multi-echelon Supply Chain Networks under Demand Uncertainty. Ind Eng Chem Res 40:3585-3604 (2001).

PCT/US2019/059269 International Search Report and Written Opinion dated Jan. 31, 2020.

AGARWAL. Multi-echelon Supply Chain Inventory Planning using Simulation-Optimization with Data Resampling (Jan. 1, 2019). Retrieved Jul. 6, 2022 from URL: https://arxiv.org/pdf/1901.00090. 22 pages.

AIKINS. Facility location models for distribution planning. European Journal of Operational Research 22 (1985) 263-279.

Chu et al. Simulation-based optimization framework for multi-echelon inventory systems under uncertainty. Computers and Chemical Engineering 73 (2015) 1-16. Available online Oct. 31, 2014.

EP19880403.1 Extended European Search Report dated Mar. 18, 2022.

Fu. Optimization for simulation: Theory vs. Practice. INFORMS Journal on Computing, vol. 14, No. 3, pp. 192-215 (2002).

Garcia et al. Model predictive control: Theory and practice—A survey. Automatica, vol. 25, No. 3, pp. 335-348 (1989).

Geoffrian et al. Multicommodity Distribution System Design by Benders Decomposition, pp. 35-61 (2010). In Sodhi et al., eds. A Long View of Research and Practice in Operations Research and Management Science. International Series in Operations Research & Management Science, vol. 148. Springer, Boston, MA.

Geoffrian et al. Twenty Years of Strategic Distribution System Design: An Evolutionary Perspective. Interfaces 25:105-107 (1995).

Gupta et al. A Two-Stage Modeling and Solution Framework for Multisite Midterm Planning under Demand Uncertainty. Ind. Eng. Chem. Res. 2000, 39, 10, 3799-3813.

Ierapetritou et al. Novel Optimization Approach of Stochastic Planning Models. Ind. Eng. Chem. Res. 1994, 33, 8, 1930-1942.

Joines et al. Supply chain multi-objective simulation optimization. Proceedings of the 2002 Winter Simulation Conference, pp. 1306-1314 (2002).

Jung et al. Integrated safety stock management for multi-stage supply chains under production capacity constraints. Computers and Chemical Engineering 32 (2008) 2570-2581. Available online Apr. 23, 2008.

Köchel et al. Simulation-based optimisation of multi-echelon inventory systems. Int. J. Production Economics 93-94 (2005) 505-513.

Mayne et al. Constrained model predictive control: Stability and optimality. Automatica 36 (2000) 789-814.

Mele et al. A Simulation-Based Optimization Framework for Parameter Optimization of Supply-Chain Networks. Ind. Eng. Chem. Res. 2006, 45, 3133-3148.

Olafsson et al. Simulation optimization. Proceedings of the 2002 Winter Simulation Conference, vol. 1, pp. 79-84 (2002).

PCT/US2019/059269 International Preliminary Report on Patentability dated Apr. 27, 2021.

Ptak et al. Orlicky's material requirements planning, pp. 83-113, McGraw-Hill (2011).

Santoso et al. A stochastic programming approach for supply chain network design under uncertainty. European Journal of Operational Research, 167 (2005) 96-115. Available online May 18, 2004.

Silver et al. A heuristic for selecting lot size quantities for the case of a deterministic time-varying demand rate and discrete opportunities for replenishment. Prod. Inventory Manage., vol. 14, No. 2, pp. 64-74 (1973).

Smith et al. Demand driven performance: using smart metrics, p. xxiii, McGraw-Hill Education (2014).

Swaminathan et al. Modeling Supply Chain Dynamics: A Multiagent Approach. Decision Sciences, vol. 29, No. 3, pp. 607-632 (Summer 1998).

Velasco Acosta et al. Applicability of Demand-Driven MRP in a complex manufacturing environment. International Journal of Production Research, vol. 58, 2020—Issue 14, pp. 4233-4245.

Vidal et al. Strategic production-distribution models: A critical review with emphasis on global supply chain models. European Journal of Operational Research 98 (1997) 1-18.

Wagner et al. Dynamic version of the economic lot size model. Management Science, vol. 5, No. 1, pp. 89-96 (Oct. 1958).

European Patent Office, Communication Pursuant to Article 94(3) EPC issued in European Patent Application No. 19880403.1, dated Dec. 22, 2022, 8 pages.

Wikipedia: "Inventory optimization," Internet Article, Feb. 6, 2018 (Feb. 6, 2018), Retrieved from the Internet: https://en.wikipedia.org/w/index.php?title=Inventory_optimization&oldid=824361368 [retrieved on Dec. 16, 2022], 5 pages.

* cited by examiner

SYSTEMS AND METHODS FOR INVENTORY MANAGEMENT AND OPTIMIZATION

CROSS-REFERENCE

This application claims priority to U.S. Provisional Patent Application No. 62/754,466, filed on Nov. 1, 2018, which is entirely incorporated herein by reference.

BACKGROUND

Uncertainty may be an intrinsic and dynamic property of modern, complex supply chains. Uncertainty continually challenges inventory decisions, which may consider balancing of capital investment constraints and service-level goals. As a result of uncertainty in inventory variables, for example, software solutions for inventory management and planning may encounter challenges in accurately forecasting and predicting optimal inventory levels. In order to stay competitive in a dynamic market, businesses often need to constantly reconfigure supply chains and to manage the various types of uncertainties that are continually being introduced (e.g., both from demand-side as well as from supply-side). However, the data that is required to make informed decisions for managing these uncertainties in inventory are often stored in multiple disparate source systems (e.g., on-site or in a remote location such as a cloud network) or not tracked historically. Such systems (e.g., Material Requirements Planning, or MRP, inventory management systems), which may have been built and implemented years or decades ago, may be rule-based systems that are rigid (i.e. not adaptive to changes in supply and demand) and thus incapable of handling large volumes of data distributed across various source systems.

SUMMARY

Recognized herein is the need for systems and methods for improved inventory management and optimization using machine learning techniques, which may be applied to improve inventory management by more accurately determining optimal inventory levels.

The present disclosure provides systems and methods that may advantageously apply machine learning to accurately manage and predict inventory variables with future uncertainty. Such systems and methods may allow accurate predictions of future uncertainty in inventory variables based on aggregated data from multiple disparate data source systems, determination of optimal inventory levels, and identification of actionable recommendations to users or systems, all in real time.

In an aspect, the present disclosure provides a computer-implemented method for inventory management and optimization, comprising: (a) obtaining, by the computer, an inventory dataset comprising a plurality of inventory variables, wherein the plurality of inventory variables comprises variables having future uncertainty; (b) applying, by the computer, a trained algorithm to the inventory dataset to generate a prediction of the variables having future uncertainty; and (c) applying, by the computer, an optimization algorithm to the inventory dataset to optimize the plurality of inventory variables, thereby generating an optimized inventory dataset.

In some embodiments, obtaining the inventory dataset comprises obtaining and aggregating datasets from a plurality of disparate sources. In some embodiments, the datasets comprise internal datasets and external datasets. In some embodiments, the plurality of disparate sources are selected from the group consisting of smart devices, sensors, enterprise systems, extraprise, and Internet sources, and the datasets are persisted in a plurality of data stores. In some embodiments, the plurality of inventory variables comprises a plurality of time series. In some embodiments, the plurality of inventory variables is representative of historical inventory data and/or current inventory data. In some embodiments, the historical inventory data comprises one or more types of movements selected from the group consisting of arrival movements, consumption movements, blocked movements, and inter-factory movements. In some embodiments, the variables having future uncertainty comprise one or more of: inventory level, supply factors, supplier orders, demand factors, demand forecast, material consumption, transit time, lead time, material requirements planning (MRP), inventory holding cost, and shipping cost.

In some embodiments, the trained algorithm comprises a machine learning algorithm. In some embodiments, the machine learning algorithm is selected from the group consisting of a support vector machine (SVM), a naïve Bayes classification, a linear regression, a quantile regression, a logistic regression, a random forest, and a neural network. In some embodiments, generating the prediction comprises processing the inventory dataset to fit a statistical distribution to the plurality of inventory variables. In some embodiments, fitting the statistical distribution comprises estimating one or more statistical parameters using the historical inventory data. In some embodiments, the statistical distribution is a parametric distribution selected from the group consisting of a Gaussian distribution, a Gamma distribution, and a Poisson distribution. In some embodiments, the one or more statistical parameters is selected from the group consisting of a median, a mean, a mode, a variance, a standard deviation, a quantile, a measure of central tendency, a measure of variance, a range, a minimum, a maximum, an interquartile range, and a percentile. In some embodiments, the method further comprises using the statistical distribution to generate the prediction of the variables having future uncertainty. In some embodiments, the prediction comprises a distribution of the variables having future uncertainty. In some embodiments, the distribution of the variables having future uncertainty comprises a distribution over a future duration of time. In some embodiments, the future duration time is about 1 day, about 3 days, about 5 days, about 1 week, about 2 weeks, about 3 weeks, about 1 month, about 2 months, about 3 months, about 4 months, about 5 months, about 6 months, about 7 month, about 8 months, about 9 months, about 10 months, about 11 months, about 12 months, about 14 months, about 16 months, about 18 months, about 20 months, about 22 months, about 24 months, or more than about 24 months.

In some embodiments, the optimization algorithm comprises a constrained optimization problem. In some embodiments, the constrained optimization problem minimizes a cost function. In some embodiments, the constrained optimization problem comprises a constraint selected from the group consisting of an inventory constraint, a service level constraint, an arrival window constraint, an order size constraint, and an ordering window constraint. In some embodiments, the service level constraint comprises a confidence level that an inventory meets a demand requirement. In some embodiments, the service level constraint is about 90%, about 95%, about 98%, or about 99%. In some embodiments, the minimized cost function comprises a cost selected from the group consisting of an inventory holding cost, a shipping cost, a production delay cost, and a combination thereof. In some embodiments, the constrained optimization problem is a stochastic constrained optimization problem. In some embodiments, the optimization algorithm comprises a technique selected from the group consisting of a grid search, a random search, and a Bayesian optimization search. In some embodiments, the stochastic constrained optimization problem is a mixed integer linear programming (MILP) problem. In some embodiments, the MILP problem models the variables having future uncertainty using linear chance constraints.

In some embodiments, the method further comprises storing, by the computer, the optimized inventory dataset in a database. In some embodiments, the storing is performed through a cloud-based network. In some embodiments, the method further comprises generating, by the computer, one or more recommended inventory management decisions based on the optimized inventory dataset. In some embodiments, generating the one or more recommended inventory management decisions comprises determining a difference between the optimized inventory dataset and a reference inventory dataset. In some embodiments, the method further comprises generating, by the computer, one or more alerts of disruption risks and/or delay risks based at least in part on the optimized inventory dataset. In some embodiments, the optimized inventory dataset is generated in real time. In some embodiments, the method further comprises traversing a bill of materials (BOM), wherein the BOM comprises a dynamic hierarchical graph; and displaying the BOM to a user. In some embodiments, the BOM is traversed and displayed to the user in real time. In some embodiments, the inventory dataset comprises a plurality of inventory variables for a single-echelon inventory, wherein the single-echelon inventory corresponds to a single node or facility. In some embodiments, the optimization algorithm is configured to perform multi-echelon inventory optimization (MEIO), and the inventory dataset comprises a plurality of inventory variables for a multi-echelon inventory, wherein the multi-echelon inventory corresponds to a supply chain network comprising a plurality of nodes or facilities. In some embodiments, the optimization algorithm is configured to model the plurality of inventory variables using a probabilistic graphical model of the supply chain network. In some embodiments, the optimization algorithm is configured to model the plurality of inventory variables using a Bayesian optimization model of the supply chain network.

In another aspect, the present disclosure provides a computer system comprising a digital processing device comprising at least one processor, an operating system configured to perform executable instructions, a memory, and a computer program including instructions executable by the digital processing device to create an application for inventory management and optimization, the application comprising: an inventory module programmed to obtain an inventory dataset comprising a plurality of inventory variables, wherein the plurality of inventory variables comprises variables having future uncertainty; a prediction module programmed to apply a trained algorithm to the inventory dataset to generate a prediction of the variables having future uncertainty; and an optimization module programmed to apply an optimization algorithm to the inventory dataset to optimize the plurality of inventory variables, to generate an optimized inventory dataset.

In some embodiments, the application further comprises an aggregation module programmed to obtain and aggregate datasets from a plurality of disparate sources. In some embodiments, the datasets comprise internal datasets and external datasets. In some embodiments, the plurality of disparate sources are selected from the group consisting of smart devices, sensors, enterprise systems, extraprise, and Internet sources, and the datasets are persisted in a plurality of data stores. In some embodiments, the plurality of inventory variables comprises a plurality of time series. In some embodiments, the plurality of inventory variables is representative of historical inventory data and/or current inventory data. In some embodiments, the historical inventory data comprises one or more types of movements selected from the group consisting of arrival movements, consumption movements, blocked movements, and inter-factory movements. In some embodiments, the variables having future uncertainty comprise one or more of: inventory level, supply factors, supplier orders, demand factors, demand forecast, material consumption, transit time, lead time, material requirements planning (MRP), inventory holding cost, and shipping cost.

In some embodiments, the trained algorithm comprises a machine learning algorithm. In some embodiments, the machine learning algorithm is selected from the group consisting of a support vector machine (SVM), a naïve Bayes classification, a linear regression, a quantile regression, a logistic regression, a random forest, and a neural network. In some embodiments, generating the prediction comprises processing the inventory dataset to fit a statistical distribution to the plurality of inventory variables. In some embodiments, fitting the statistical distribution comprises estimating one or more statistical parameters using the historical inventory data. In some embodiments, the statistical distribution is a parametric distribution selected from the group consisting of a Gaussian distribution, a Gamma distribution, and a Poisson distribution. In some embodiments, the one or more statistical parameters is selected from the group consisting of a median, a mean, a mode, a variance, a standard deviation, a quantile, a measure of central tendency, a measure of variance, a range, a minimum, a maximum, an interquartile range, and a percentile. In some embodiments, the prediction module is programmed to use the statistical distribution to generate the prediction of the variables having future uncertainty. In some embodiments, the prediction comprises a distribution of the variables having future uncertainty. In some embodiments, the distribution of the variables having future uncertainty comprises a distribution over a future duration of time. In some embodiments, the future duration time is about 1 day, about 3 days, about 5 days, about 1 week, about 2 weeks, about 3 weeks, about 1 month, about 2 months, about 3 months, about 4 months, about 5 months, about 6 months, about 7 month, about 8 months, about 9 months, about 10 months, about 11 months, about 12 months, about 14 months, about 16 months, about 18 months, about 20 months, about 22 months, about 24 months, or more than about 24 months.

In some embodiments, the optimization algorithm comprises a constrained optimization problem. In some embodiments, the constrained optimization problem minimizes a cost function. In some embodiments, the constrained optimization problem comprises a constraint selected from the group consisting of an inventory constraint, a service level constraint, an arrival window constraint, an order size constraint, and an ordering window constraint. In some embodiments, the service level constraint comprises a confidence level that an inventory meets a demand requirement. In some embodiments, the service level constraint is about 90%, about 95%, about 98%, or about 99%. In some embodiments, the minimized cost function comprises a cost selected from the group consisting of an inventory holding cost, a shipping cost, a production delay cost, and a combination thereof. In some embodiments, the constrained optimization problem is a stochastic constrained optimization problem. In some embodiments, the optimization algorithm comprises a technique selected from the group consisting of a grid search, a random search, and a Bayesian optimization search. In some embodiments, the stochastic constrained optimization problem is a mixed integer linear programming (MILP) problem. In some embodiments, the MILP problem models the variables having future uncertainty using linear chance constraints.

In some embodiments, the application further comprises a storage module programmed to store the optimized inventory dataset in a database. In some embodiments, the storing is performed through a cloud-based network. In some embodiments, the application further comprises a decision module programmed to generate one or more recommended inventory management decisions based on the optimized inventory dataset. In some embodiments, generating the one or more recommended inventory management decisions comprises determining a difference between the optimized inventory dataset and a reference inventory dataset. In some embodiments, the application further comprises an alert module programmed to generate one or more alerts of disruption risks and/or delay risks based at least in part on the optimized inventory dataset. In some embodiments, the optimized inventory dataset is generated in real time. In some embodiments, the application further comprises a display module programmed to traverse a bill of materials (BOM), wherein the BOM comprises a dynamic hierarchical graph, and display the BOM to a user. In some embodiments, the BOM is traversed and displayed to the user in real time. In some embodiments, the inventory dataset comprises a plurality of inventory variables for a single-echelon inventory, wherein the single-echelon inventory corresponds to a single node or facility. In some embodiments, the optimization algorithm is configured to perform multi-echelon inventory optimization (MEIO), and the inventory dataset comprises a plurality of inventory variables for a multi-echelon inventory, wherein the multi-echelon inventory corresponds to a supply chain network comprising a plurality of nodes or facilities. In some embodiments, the optimization algorithm is configured to model the plurality of inventory variables using a probabilistic graphical model of the supply chain network. In some embodiments, the optimization algorithm is configured to model the plurality of inventory variables using a Bayesian optimization model of the supply chain network.

In another aspect, the present disclosure provides a non-transitory computer readable medium comprising machine-executable code that, upon execution by one or more computer processors, implements a method for inventory management and optimization, the method comprising: (a) obtaining an inventory dataset comprising a plurality of inventory variables, wherein the plurality of inventory variables comprises variables having future uncertainty; (b) applying a trained algorithm to the inventory dataset to generate a prediction of the variables having future uncertainty; and (c) applying an optimization algorithm to the inventory dataset to optimize the plurality of inventory variables, thereby generating an optimized inventory dataset.

In another aspect, the present disclosure provides a system that can receive an inventory dataset comprising a plurality of inventory variables that indicate at least historical (i) inventory levels, (ii) inventory holding costs, (iii) supplier orders, and/or (iv) lead times over time. The plurality of inventory variables can be characterized by having one or more future uncertainty levels. The system can process the inventory dataset using a trained machine learning model to generate a prediction of the plurality inventory variables that are characterized by having one or more future uncertainty levels. The system can provide the processed inventory dataset to an optimization algorithm. The optimization algorithm can be used to predict a target inventory level for optimizing an inventory holding cost. The optimization algorithm can comprise one or more constraint conditions that require the target inventory level to at least satisfy a present, incoming or expected demand requirement.

In some embodiments, the system can provide a current inventory level and a quantity of current supplier orders to the optimization algorithm and use the optimization algorithm to predict the target inventory level based at least on the current inventory level and the quantity of current supplier orders. In some embodiments, the system can generate an inventory management recommendation based on the prediction of the target inventory level. In some embodiments, the inventory management recommendation can comprise a recommendation to reduce the current inventory level. In some embodiments, the inventory management recommendation can comprise a recommendation to increase the current inventory level. In some embodiments, the inventory management recommendation can be generated in real time.

In some embodiments, the system can compute the present, incoming or expected demand requirement using forecasted demand for finished products and a bill of materials (BOM) for the finished products. In some embodiments, the BOM can comprise a dynamic hierarchical graph.

In some embodiments, the inventory dataset can comprise internal data and external data. In some embodiments, the inventory dataset can be received from a plurality of disparate sources selected from the group consisting of smart devices, sensors, enterprise systems, extraprise, and Internet sources.

In some embodiments, the plurality of inventory variables further can comprise one or more inventory movements selected from the group consisting of arrival movements, consumption movements, blocked movements, and inter-factory movements.

In some embodiments, the plurality of inventory variables can further comprise one or more of a demand forecast, material consumption, transit time, and shipping cost.

In some embodiments, the trained machine learning model can be selected from the group consisting of a support vector machine (SVM), naïve Bayes classification, linear regression, logistic regression, a random forest, and a neural network.

In some embodiments, the prediction of the plurality of inventory variables can comprise a statistical distribution of the plurality of inventory variables.

In some embodiments, the statistical distribution can comprise one or more statistical parameters.

In some embodiments, the one or more statistical parameters can be selected from the group consisting of a median, a mean, a mode, a variance, a standard deviation, a quantile, a measure of central tendency, a measure of variance, a range, a minimum, a maximum, an interquartile range, and a percentile.

In some embodiments, the statistical distribution can be a parametric distribution selected from the group consisting of a Gaussian distribution, a Gamma distribution, and a Poisson distribution.

In some embodiments, the optimization algorithm can minimize a cost function. In some embodiments, the optimization algorithm can further comprise a constraint condition selected from the group consisting of an inventory constraint, a service level constraint, an arrival window constraint, an order size constraint, and an ordering window constraint. In some embodiments, the optimization algorithm can be a stochastic constrained optimization algorithm. In some embodiments, the stochastic constrained optimization algorithm can be a mixed integer linear programming (MILP) problem. In some embodiments, the optimization algorithm can comprise a technique selected from the group consisting of a grid search, a random search, and a Bayesian optimization search.

In some embodiments, the inventory dataset can comprise a plurality of inventory variables for a single-echelon inventory, wherein the single-echelon inventory corresponds to a single node or facility.

In some embodiments, the optimization algorithm can be configured to perform multi-echelon inventory optimization (MEIO), wherein the inventory dataset can comprise a plurality of inventory variables for a multi-echelon inventory, wherein the multi-echelon inventory corresponds to a supply chain network comprising a plurality of nodes or facilities. In some embodiments, the optimization algorithm can be configured to model the plurality of inventory variables using a probabilistic graphical model of the supply chain network. In some embodiments, the optimization algorithm can be configured to model the plurality of inventory variables using a Bayesian optimization model of the supply chain network.

Another aspect of the present disclosure provides methods corresponding to the operations performed by any of the systems described above or elsewhere herein.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings (also "Figure" and "FIG." herein), of which:

DETAILED DESCRIPTION

Figure 1:
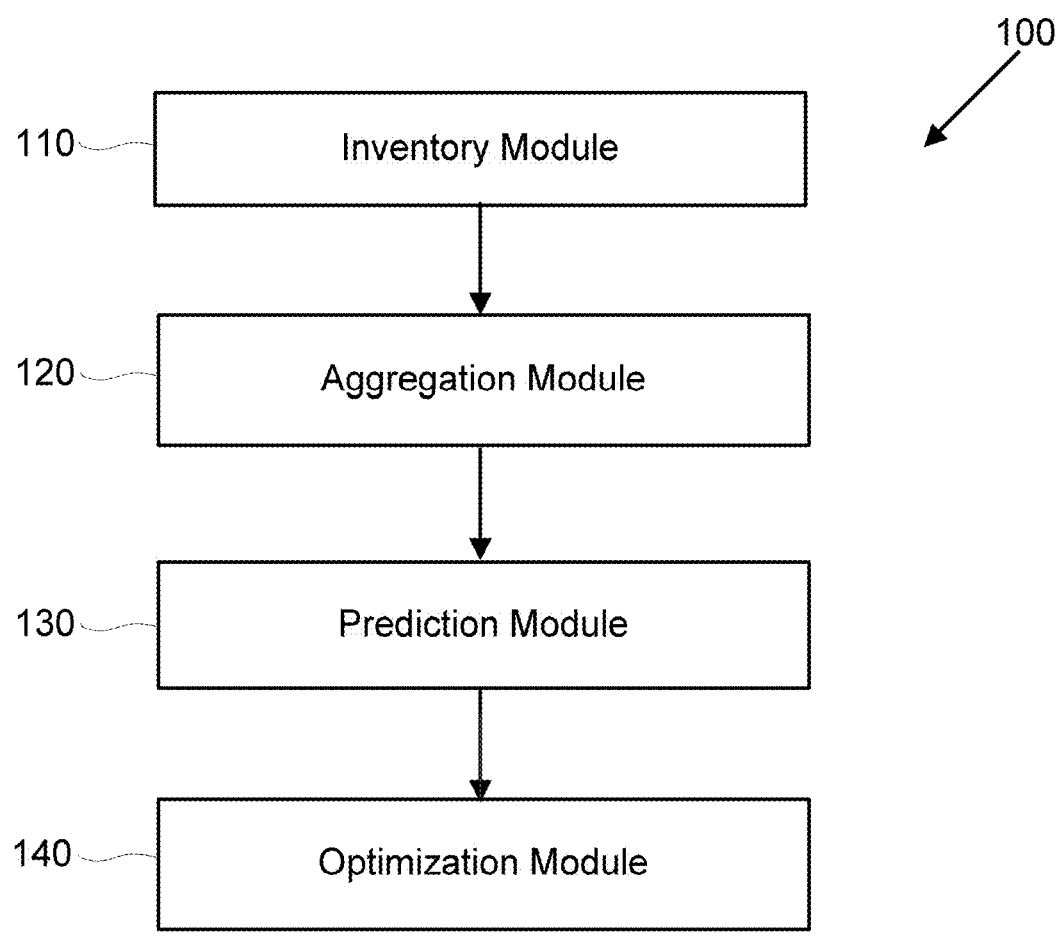
FIG. 1 illustrates an example of a system for inventory management and optimization.

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Recognized herein is the need for systems and methods for improved inventory management and optimization using machine learning techniques, which may be applied to improve inventory management by more accurately determining optimal inventory levels.

Uncertainty may be an intrinsic and dynamic property of modern, complex supply chains. Uncertainty continually challenges inventory decisions, which may consider balancing of capital investment constraints and service-level goals. As a result of uncertainty in inventory variables, for example, software solutions for inventory management and planning may encounter challenges in accurately forecasting and predicting optimal inventory levels. In order to stay competitive in a dynamic market, businesses often need to constantly reconfigure supply chains and to manage the various types of uncertainties that are continually being introduced (e.g., both from demand-side as well as from supply-side). However, the data that is required to make informed decisions for managing these uncertainties in inventory are often stored in multiple disparate source systems (e.g., on-site or in a remote location such as a cloud network). Such systems (e.g., Material Requirements Planning, or MRP, inventory management systems), which may have been built and implemented years or decades ago, may be rule-based systems that are rigid and thus incapable of handling large volumes of data distributed across various source systems.

In view of these challenges in inventory management systems, a "big data" artificial intelligence platform may be necessary to aggregate data from multiple disparate source systems (e.g., enterprise system, IoT sensors, and third party data providers) and apply artificial intelligence-based techniques that continually incorporate and learn from new or updated datasets. For example, the types of data useful for optimizing inventory may include demand forecast, supplier orders, production orders, bill of materials (time-varying), change history of re-order parameters, and inventory movement data.

Recognizing the need for improved inventory management and optimization, the present disclosure provides systems and methods that may advantageously apply machine learning to accurately manage and predict inventory variables with future uncertainty. Such systems and methods may allow accurate predictions of future uncertainty in inventory variables based on aggregated data from multiple disparate data source systems, determination of optimal inventory levels, and identification of actionable recommendations to users, all in real time.

By implementing improved inventory management and optimization systems and methods of the present disclosure, companies across a broad range of industries, such as manufacturing, automotive, and retail, may achieve significance reductions in inventory by 20% to 25% through optimization, thereby decreasing costs by about 2% to 5% of revenues. In doing so, such companies, which may typically lock up a significant part of their working capital in inventory (e.g., an average inventory ranging from 10%-20% of revenue), can reinvest the cost savings into the company's business in order to increase shareholder value. For example, a company with $10 billion in annual revenue can potential free up $200 million to $500 million in working capital by optimizing their inventory using systems and methods provided herein.

In order to effectively apply artificial intelligence based methods to inventory management and optimization systems, the necessary data may be aggregated from various disparate source systems, such as an Enterprise Resource Planning system, an Asset Management system, a Supplier Management system, and an Inventory Planning system. In some cases, enterprises may engage third-party service providers to perform data integration, which may be costly. Alternatively, enterprises may attempt to perform data integration in-house using open-source technologies, but such approaches often encounter significant complexity and monetary and time costs, with uncertain success. Using systems and methods of the present disclosure, enterprises can apply artificial intelligence based inventory management and optimization algorithms on platforms that enable seamless, scalable, and reliable integration of data sets from multiple disparate source systems.

Once the data aggregation and integration have been performed, artificial intelligence based techniques can be used to effectively and dynamically manage uncertainty, and systematically reduce inventory levels across all locations while minimizing the probability of stock-outs. In particular, systems and methods of the present disclosure can apply key elements of artificial intelligence-based techniques, including statistical modeling, machine learning, and optimization, to significantly improve inventory optimization.

In an aspect, the present disclosure provides a computer-implemented method for inventory management and optimization. The method for inventory management and optimization may comprise obtaining an inventory dataset comprising a plurality of inventory variables, wherein the plurality of inventory variables comprises variables having future uncertainty. The method for inventory management and optimization may further comprise applying a trained algorithm to the inventory dataset to generate a prediction of the variables having future uncertainty. The method for inventory management and optimization may further comprise applying an optimization algorithm to the inventory dataset to optimize the plurality of inventory variables, thereby generating an optimized inventory dataset.

Statistical Modeling of Uncertainty

FIG. 1 illustrates an example of a system for inventory management and optimization 100. In some embodiments, an inventory module may be programmed or configured to obtain an inventory dataset. The inventory dataset may comprise inventory variables, such as inventory variables having future uncertainty. Uncertainty may pertain to a difference between an actual consumption versus a forecasted consumption (demand forecast), between an ordered quantity versus a delivered quantity, between a promised delivery date versus an actual delivery date, etc. For example, variables having future uncertainty (e.g., stochasticity) may include inventory level, supply factors, supplier orders, demand factors, demand forecast, material consumption, transit time, lead time, material requirements planning (MRP), inventory holding cost, and shipping cost.

Figure 2:
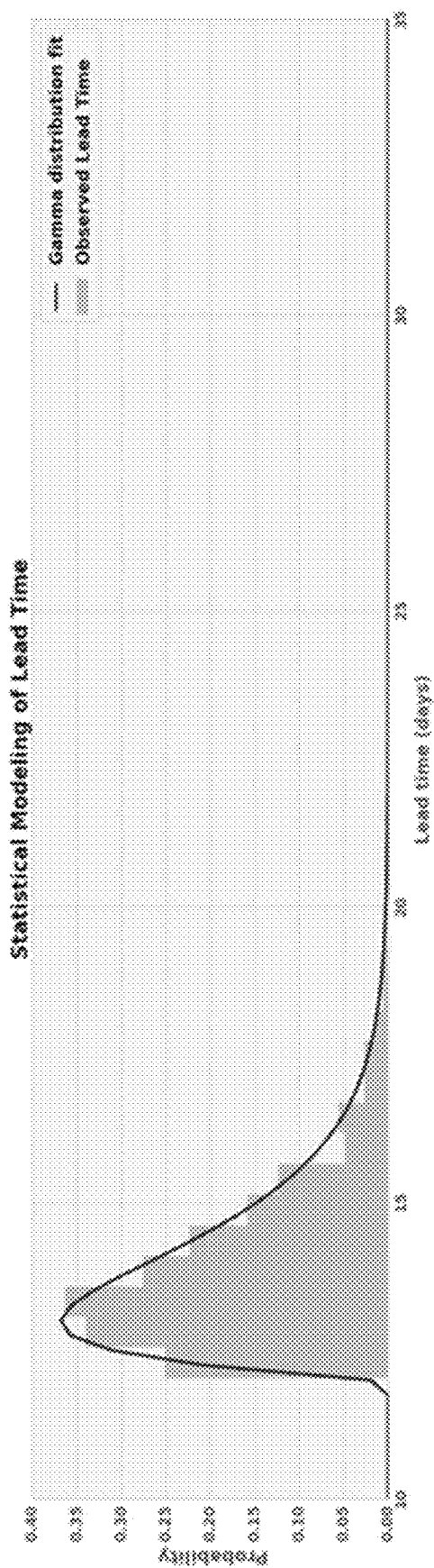
FIG. 2 illustrates an example of statistical modeling of uncertainty in lead time by fitting a Gamma distribution to observed lead time data.

For a given enterprise, the distribution of uncertainty (e.g., of inventory variables) can be modeled using historical data. As an example, the transit time (or the lead time) (e.g., of goods or materials) from a supplier to a manufacturing facility is often stochastic and not deterministic, and may depend on one or more external factors, such as network congestion, weather, and geo-political events. As an example, if a simple Gaussian distribution is assumed for the transit time, then such a Gaussian distribution can be fitted to a set of observed historical data to estimate a mean and a variance of the transit time. However, in practice, the actual distribution of transit time is often asymmetric, and thus the Gamma distribution may be used where the shape and the scale parameters can be estimated from historical data. FIG. 2 illustrates an example of statistical modeling of uncertainty in lead time by fitting a Gamma distribution to observed lead time data. The distribution may be calculated over a lead time of no more than about 5 days, no more than about 10 days, no more than about 15 days, no more than about 20 days, no more than about 25 days, no more than about 30 days, no more than about 35 days, no more than about 40 days, no more than about 45 days, no more than about 50 days, no more than about 55 days, no more than about 60 days, no more than about 70 days, no more than about 80 days, or no more than about 90 days.

The inventory variables may comprise one or more time series to represent time-varying data, such as historical inventory data and/or current inventory data. Historical inventory may be provided by the customer, or calculated by the system by leveraging the material movement data. For example, the historical inventory data can include different types of movements related to inventory management and optimization, such as arrival movements, consumption movements, blocked movements, and miscellaneous movements (e.g., inter-factory movements).

In some embodiments, an aggregation module 120 may be programmed or configured to obtain and aggregate datasets from a plurality of disparate sources. For example, the datasets can comprise internal datasets and external datasets. Examples of disparate sources may include smart devices, sensors, enterprise systems, extraprise, and Internet sources. Such datasets may be persisted across one or more data stores.

Modeling and Prediction of Stochastic Variables With Future Uncertainty

The distribution of uncertainty often tends to change over time. As an example, the variance in the transit time may increase during the winter season. As a result, in addition to estimating the distribution of transit time based on the past data, effective inventory management and optimization methods and systems need to be able to predict this distribution over the planning horizon. Machine learning can be applied to model stochastic variables with future uncertainty by learning the past trends in uncertainty distribution and to predict the future uncertainty of such stochastic variables.

In some embodiments, a prediction module 130 may be programmed or configured to apply a trained algorithm to the inventory dataset to generate a prediction of the stochastic variables having future uncertainty. In some cases, the trained algorithm comprises a machine learning algorithm, such as a support vector machine (SVM), a naïve Bayes classification, a linear regression, a quantile regression, a logistic regression, a random forest, a neural network, or a combination thereof. For example, the prediction may be generated by processing the inventory dataset to fit a statistical distribution to the plurality of inventory variables. The statistical distribution may be fitted by estimating one or more statistical parameters using the historical inventory data. For example, the statistical distribution may be a parametric distribution, such as a Gaussian distribution, a Gamma distribution, or a Poisson distribution. The statistical parameters may include, for example, a median, a mean, a mode, a variance, a standard deviation, a quantile, a measure of central tendency, a measure of variance, a range, a minimum, a maximum, an interquartile range, a percentile, or a combination thereof.

The method for inventory management and optimization may further use the statistical distribution to generate the prediction of the stochastic variables having future uncertainty. The prediction may comprise a distribution of the stochastic variables having future uncertainty. For example, the distribution of the stochastic variables having future uncertainty may include a distribution over a future duration of time. The future duration of time may correspond to a planning horizon for the material being optimized. The planning horizon may vary depending on the customer, supplier, and the material. For example, the future duration time may be about 1 day, about 3 days, about 5 days, about 1 week, about 2 weeks, about 3 weeks, about 1 month, about 2 months, about 3 months, about 4 months, about 5 months, about 6 months, about 7 month, about 8 months, about 9 months, about 10 months, about 11 months, about 12 months, about 14 months, about 16 months, about 18 months, about 20 months, about 22 months, about 24 months, or more than about 24 months.

Figure 3:
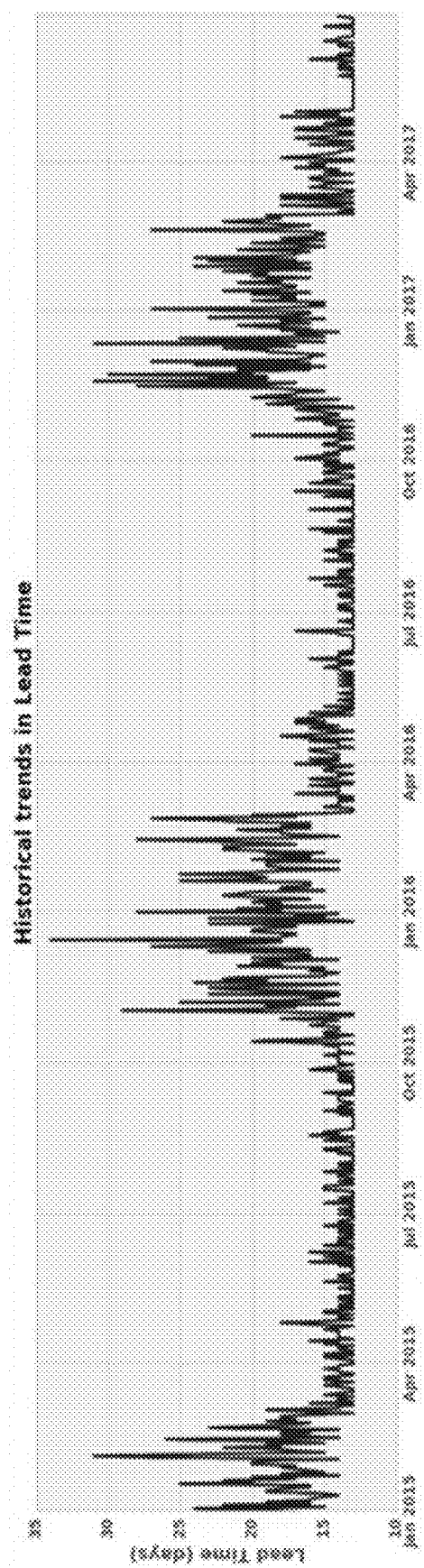
FIG. 3 illustrates an example of historical trends in lead time over a period of time, which can be used to train a machine learning algorithm to predict future uncertainty in lead time.

FIG. 3 illustrates an example of historical trends in lead time over a period of time (e.g., about 28 months), which can be used to train a machine learning algorithm to predict future uncertainty in lead time.

Stochastic Optimization of Inventory Level

Manufacturers typically use rule-based systems to determine the timing and size of orders that need to be placed with suppliers. The static rules may not account for any variability which may yield sub-optimal inventory levels. Using artificial intelligence based (e.g., machine learning) approaches, inventory management and optimization can be formulated as a constrained optimization problem, where a goal is to minimize a cost function (e.g., an inventory holding cost) under one or several constraints, such as a confidence level of availability of stock.

Figure 4:
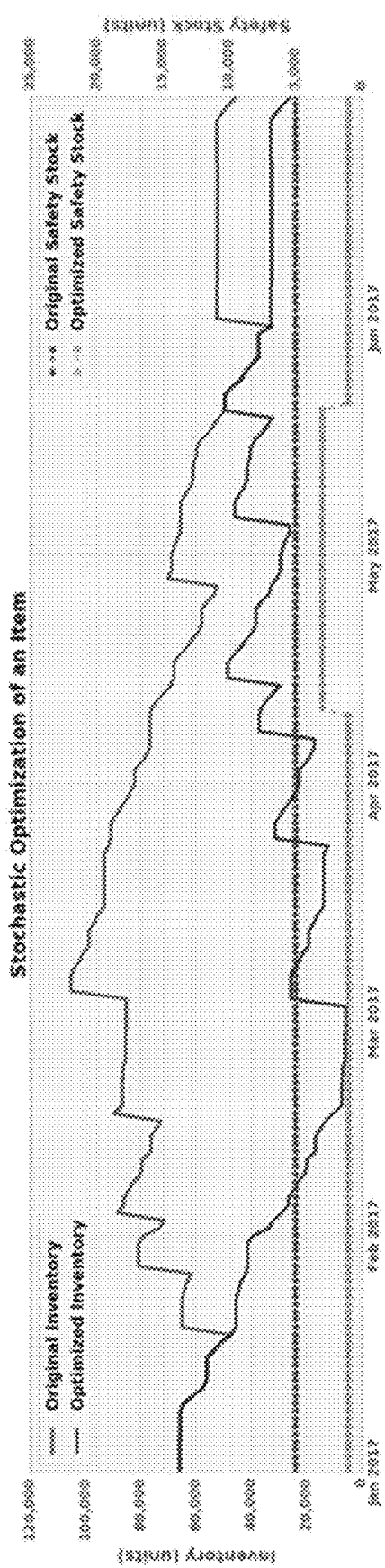
FIG. 4 illustrates an example of stochastic optimization of inventory level of an item.

FIG. 4 illustrates an example of stochastic optimization of inventory level of an item over a period of time (e.g., about 6 months). For example, an original inventory level over a duration of time may be configured to have a high probability or confidence of maintaining an inventory level that is at least the original safety stock level. As another example, the optimized inventory level over a duration of time may be configured to have a high probability or confidence of maintaining an inventory level that is at least the optimized safety stock level. Since the optimized safety stock level may be less than the original (un-optimized) safety stock level, the enterprise may realize potentially significant cost savings by maintaining inventory at the optimized safety stock level rather than the original safety stock level, while still meeting contractual requirements of their customers.

In some embodiments, an optimization module 140 may be programmed or configured to apply an optimization algorithm to the inventory dataset to optimize the plurality of inventory variables, to generate an optimized inventory dataset. For example, the optimization algorithm can comprise a constrained optimization problem. Such a constrained optimization problem may minimize a cost function, and may include constraints pertaining to the material ordering mechanism or MRP (material requirement planning) algorithm, such as an inventory constraint, a service level constraint, an arrival window constraint (e.g., days of the week when orders can arrive), an order size constraint (e.g., a minimum order size and rounding value), an ordering window constraint (e.g., with inactive or dead periods during which new orders cannot be placed), or a combination thereof. The set of constraints for the constrained optimization problem may help determine allowed times and amounts for which orders can be placed. In some embodiments, the service level constraint comprises a confidence level that an inventory meets a demand requirement (e.g., does not experience a stock-out event).For example, the service level constraint may be about 90%, about 95%, about 98%, or about 99%. The service level constraint may correspond to the service level that is desired by the customer. The desired service level may be a configurable parameter and may vary for each customer and for each material.

In some embodiments, the minimized cost function can represent a cost such as an inventory holding cost, a shipping cost, a backorder (e.g., production delay) cost, or a combination thereof. The cost function may be configurable and can vary with each customer.

The constrained optimization problem may be a stochastic constrained optimization problem. For example, in instances where an enterprise is bound to using currently implemented legacy MRP solutions, the current MRP algorithm may be treated as a black-box, and the constrained optimization problem may be solved using a black-box optimization algorithm. The optimization algorithm may use any suitable technique for solving the optimization problem, such as a grid search, a random search, a Bayesian optimization search, or a combination thereof.

In some embodiments, such as instances where an enterprise is not bound to using legacy MRP solutions, the stochastic constrained optimization problem is formulated as a mixed integer linear programming (MILP) problem. The MILP problem may model the variables having future uncertainty using one or more linear chance constraints. The MILP problem may be solved, for example, by jointly optimizing for the inventory and the MRP (e.g., orders placed).

After the inventory dataset has been optimized, the optimized inventory dataset may be stored in a database. The storing may be performed through a cloud-based network (e.g., in a database located on one or more cloud-based servers). In some cases, the optimized inventory dataset is generated in real time and/or stored in the database in real time.

The method for inventory management and optimization may further comprise generating one or more recommended inventory management decisions based on the optimized inventory dataset. For example, a difference may be determined between the optimized inventory dataset and a reference inventory dataset, and the recommended inventory management decisions may be generated based on the determined difference between the optimized inventory dataset and the reference inventory dataset. In some cases, after the inventory dataset has been optimized, the method for inventory management and optimization may further comprise generating one or more alerts of disruption risks and/or delay risks based at least in part on the optimized inventory dataset.

Optimization of Daily Inventory Level, Demand, and MRP

In some embodiments, methods and systems for inventory management and optimization may perform optimization of a daily inventory level. Manufacturing systems typically maintain a log of inventory movements, such as arrivals from suppliers, consumption in a production line, and any other intra- and inter-facility shipments (miscellaneous movements). The movement data can be used to calculate the historical inventory levels for each item, where arrivals have a positive contribution to the inventory level, consumption has a negative contribution, and all other miscellaneous movements can result in either a positive or a negative contribution to the inventory level. For example, the inventory at a given time t can be expressed as the inventory at a prior time (t−1), plus the arrivals at time t, minus the consumption at time t, plus miscellaneous movements at time t, as given by the equation below.

$$\text{Inventory}_t = \text{Inventory}_{t-1} + \text{Arrivals}_t - \text{Consumption}_t + \text{Miscellaneous}_t$$

Figure 5:
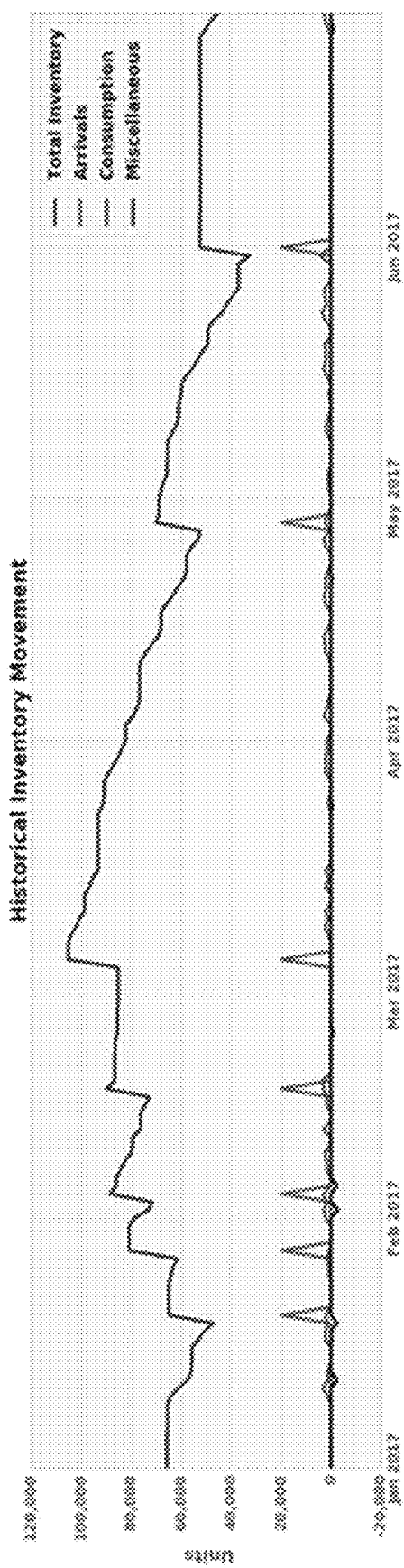
FIG. 5 illustrates an example of historical inventory movement (including arrival movements, consumption movements, and miscellaneous movements) and total inventory over a period of time.

FIG. 5 illustrates an example of historical inventory movement (including arrival movements, consumption movements, and miscellaneous movements) and total inventory over a period of time (e.g., about 6 months).

In some embodiments, methods and systems for inventory management and optimization may perform optimization of a demand forecast. In the case of manufacturers, the demand forecast (or planned consumption) for each item over a planning horizon can be computed using the forecasted demand for the finished products, the product configurations, and a bill of materials (BOM). BOM is a dynamic (time-varying) hierarchical graph that provides a list of all the items and intermediate assemblies required to manufacture a finished product, along with their quantities. The traversed BOM may be displayed to a user. For example, the BOM may be traversed and displayed to the user in real time.

In some embodiments, methods and systems for inventory management and optimization may perform optimization of Material Requirements Planning (MRP). MRP is often based on several constraints that determine the timing and quantity of the orders that need to be placed with suppliers. For example, such constraints may be defined using reorder parameters. Reorder parameters may be categorized into two groups: (1) parameters determined by the manufacturer (e.g., safety stock, lot size, or safety time) and (2) parameters determined by the supplier (e.g., minimum order size, lead time, etc.).

In some embodiments, methods and systems may formulate inventory management and optimization as a stochastic constrained optimization problem that solves for the optimal values of reorder parameters (e.g., safety stock) that minimize the total landed cost (e.g., inventory holding cost and shipping cost), while maintaining a level of confidence (a) on the availability of items in stock (e.g., a service level constraint). The service level constraint may be adjustable for each item (e.g., with a 90%, 95%, 96%, 97%, 98%, or 99% confidence), thereby providing the manufacturer a level of control based on several factors, such as cost of stock-outs and service level agreements with their customers.

By solving the stochastic constrained optimization problem, a set of stochastic variables may be simulated or predicted. The predictions can then be incorporated into the optimization problem. For example, variables corresponding to stochastic components of a supply chain (e.g., stochasticity associated to supply for each facility in the supply chain) can be modeled. This can be done through conducting a forward pass through the supply chain. Particularly, the forward pass can begin with facilities i without children. For these facilities, it is known what arrivals will actually arrive at time t and what arrivals are scheduled to arrive at the facility. For the latter, the stochasticity (uncertainty) in quantity and time can be simulated to predict what portion of the arrival will be realized that day. This result can partly define the end-of-day inventory of that facility for that day.

Moreover, each of these facilities, having run their MRPs at time t, may how much of their dependent and independent demand they want to satisfy. Each facility, given its available inventory of the day and knowledge about the set of material movements which have occurred in each facility, may or may not have enough material to satisfy the demand it wants to. In case it does not have enough, an assumption can be made that it starts satisfying the demands for parties with the highest penalty until it runs out of inventory. The remainder of the demand will be moved to the next time point for satisfaction. At this point, knowledge about what actually will arrive on that day and what remains in the inventory can enable computation of the end-of-day inventory for that facility. Furthermore, knowledge about much material will be shipped from every such facility i to its parents can be incorporated. Assuming that the uncertainty associated to every edge (i,j) is known for all such parent facilities j of facility i, the uncertainty associated with arrival at facility j can be simulated based on the shipment at time t. At this point, every node for which all its children have concluded the above outlined computations, can conduct its own set of simulations and predictions. This process may then continue until nodes without parents are reached, at which point the simulation of the behavior of the supply network at time t is concluded.

For example, the optimization problem given below can be formulated as a mixed integer linear programming (MILP) problem by modeling demand and supply-side uncertainties as linear chance constraints. Such MILP problems can be efficiently solved using MILP solvers.

$$\operatorname*{argmin}_{\text{Safety stock}} \text{Inventory Holding cost} +$$

Shipping cost such that $\text{Prob}(\text{Inventory} > 0) \geq \alpha$

Systems and methods for inventory management and optimization may be applied to a wide variety of enterprises, such as global manufacturers with footprints across multiple countries or continents. For example, such manufacturers may operate hundreds of factories globally, manufacturer highly complex equipment, and hold average inventory levels worth hundreds of millions or even billions of dollars. For example, based on standard industry practice among manufacturers of expensive and sophisticated equipment (e.g., industrial equipment), manufacturers may allow their customers to configure products with dozens or hundreds of individual options, leading to products having hundreds or thousands of permutations. In such cases, the customized nature of the manufacturer's products may drive significant complexity in managing inventory levels during the manufacturing process. For example, since the final configuration of a product is often not known until close to submission of the order for that product, the manufacturer may routinely hold significant excess inventory on hand to fulfill orders on time.

Using systems and methods for inventory management and optimization disclosed herein, manufacturers may achieve significant reductions in average inventory levels of about 5%, about 10%, about 15%, about 20%, about 25%, about 30%, about 35%, about 40%, about 45%, about 50%, about 55%, about 60%, about 65%, about 70%, about 75%, about 80%, about 85%, or about 90%. Such significant reductions in average inventory levels may confer additional benefits, such as savings in shipping cost (due to fewer parts being ordered) and increased productivity of inventory analysts by helping them focus on higher value-added tasks instead of tracking, managing and auditing available inventory. In addition, using systems and methods for inventory management and optimization disclosed herein, key insights may be uncovered which may prove useful during negotiations with suppliers (e.g., the effect of supplier planning time fence on inventory levels).

Figure 6:
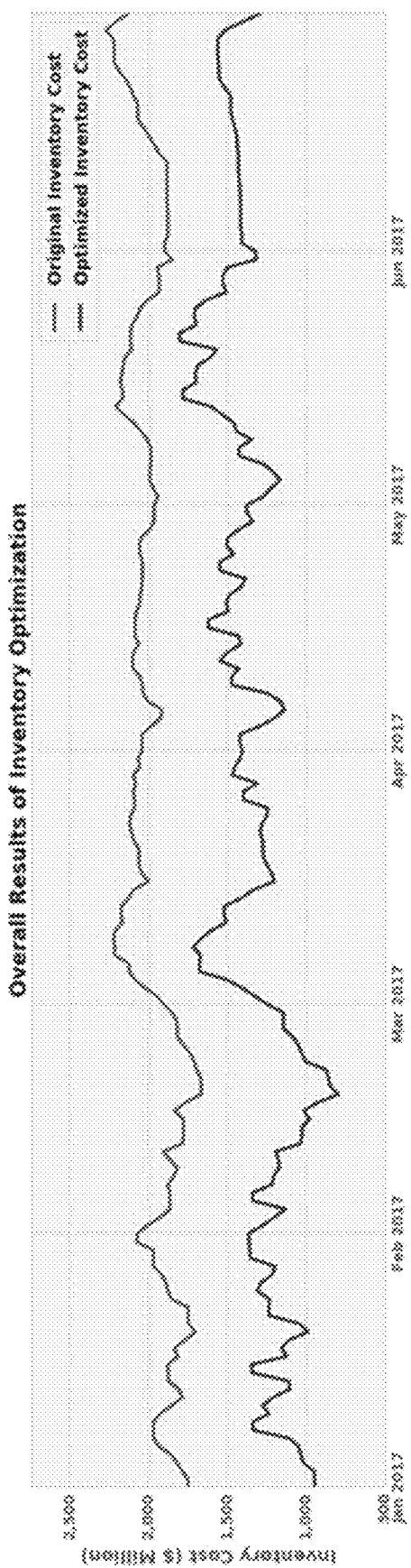
FIG. 6 illustrates an example of overall results in inventory optimization.

FIG. 6 illustrates an example of overall results in inventory optimization over a period of time (e.g., about 6 months). Using systems and methods for inventory management and optimization disclosed herein, the manufacturer reduced inventory costs by about 30% (when comparing an optimized inventory cost relative to an original inventory cost) and realized a total cost savings of hundreds of millions of dollars.

Multi-Echelon Inventory Optimization (MEIO)

Systems and methods for inventory management and optimization may be applied toward multi-echelon inventory optimization (MEIO), which generally refers to a problem of optimizing inventory across all nodes in a supply chain. MEIO approaches may optimize the inventories across the network holistically, by leveraging the relationships between nodes in the network. For example, the inventory dataset may comprise inventory variables for either a single-echelon inventory (e.g., corresponding to a single node or facility) or, in the case of MEIO approaches, a multi-echelon inventory (e.g., corresponding to a supply chain with a plurality of nodes or facilities).

In some embodiments, the MEIO problem may be formulated as a probabilistic graphical model. The probabilistic graphical model may contain a graph with nodes representing facilities and directed edges (i, j) representing that facility i can supply facility j. For example, the probabilistic graphical model can be used to compute optimal scheduled arrivals at any given time t into the future for such a supply chain network, or an optimal safety stock and safety time for each facility in the network.

The probabilistic graphical model can be combined with a data-driven machine learning based training system. The machine learning system may be used to train models to learn how the distribution of random variables change over time and predict the distribution in the future, as described elsewhere herein. The probabilistic graphical model can then be used to propagate information across nodes in the supply chain and to learn the inter-relationships across nodes in the supply chain.

In the MEIO problem, the underlying supply chain network may define the global graphical structure. The local structure of the graphical model may be defined by the relationship among the various random (e.g., stochastic) variables in the optimization problem, such as inventory, demand forecast, material movements, supplier orders, etc. Such random variables may have stochastic distributions which may be typically time-varying. Regression models may be trained to learn from historical data how these distributions vary over time, based on features such as season of the year, etc. The trained regression models may then be used to predict the prior and conditional distribution of the random variables. Each node in the supply chain may estimate the distributions of the random variables locally and shares this information with other nodes in the supply chain using belief propagation techniques. The nodes continue to propagate their beliefs with other nodes in the system till convergence. Once the beliefs converge, the recommended safety stock at each node can be estimated locally using the conditional distribution of the inventory variable.

The multi-echelon inventory optimization (MEIO) can be performed by applying an inventory optimization approach for a single facility to every facility in the network. For example, every facility, having observed its historical suppliers' behavior, uncertainty over its demand forecast and other miscellaneous behavior at the facility, can optimize its safety stock and safety time in isolation from other facilities in the network.

In some embodiments, the MEIO problem may comprise modeling the supply chain network and optimizing the inventory variables using Bayesian optimization. For example, optimal safety stock and safety time values may be determined for each facility by jointly optimizing quantity and time uncertainties for all facilities in the network. A grid of possible order parameter values can be created across the nodes in the supply chain, and the system can be simulated with each combination to compute the cost and service level. The system can be optimized to obtain an optimal combination of parameters, such as by performing an exhaustive grid search or a random search. However, such approaches can be expensive. As an example, if each node in the supply chain network with N nodes takes 10 possible values for the order parameters, then the total number of possible combinations to search over is $10^N$. The list of total combinations can quickly get prohibitively large to evaluate and find the optimal combination.

Alternatively, Bayesian optimization may be used to obtain the optimal combination of parameters, with decreased computational complexity. Bayesian optimization may refer to a sequential technique that suggests the next best combination to evaluate given all the prior combinations evaluated. Applying Bayesian optimization may enable computation of optimal combinations by visiting only a subset of the grid points of parameter values. Such an approach may be advantageous and enable such benefits such as using Gaussian process models as the underlying models, using probabilistically meaningful acquisition functions that provide probabilistic guarantees concerning quality of the solution, using the evaluated data points from the previous optimization run for the current time by modifying the used kernel appropriately, and setting a computational time or resources budget for the optimization and interrupting safely if the computational time or resources budget is surpassed. The computational complexity of the Bayesian optimization approach can be expected, in the very worst case, to be exponential in the number of facilities in the network.

Computer Systems

Figure 7:
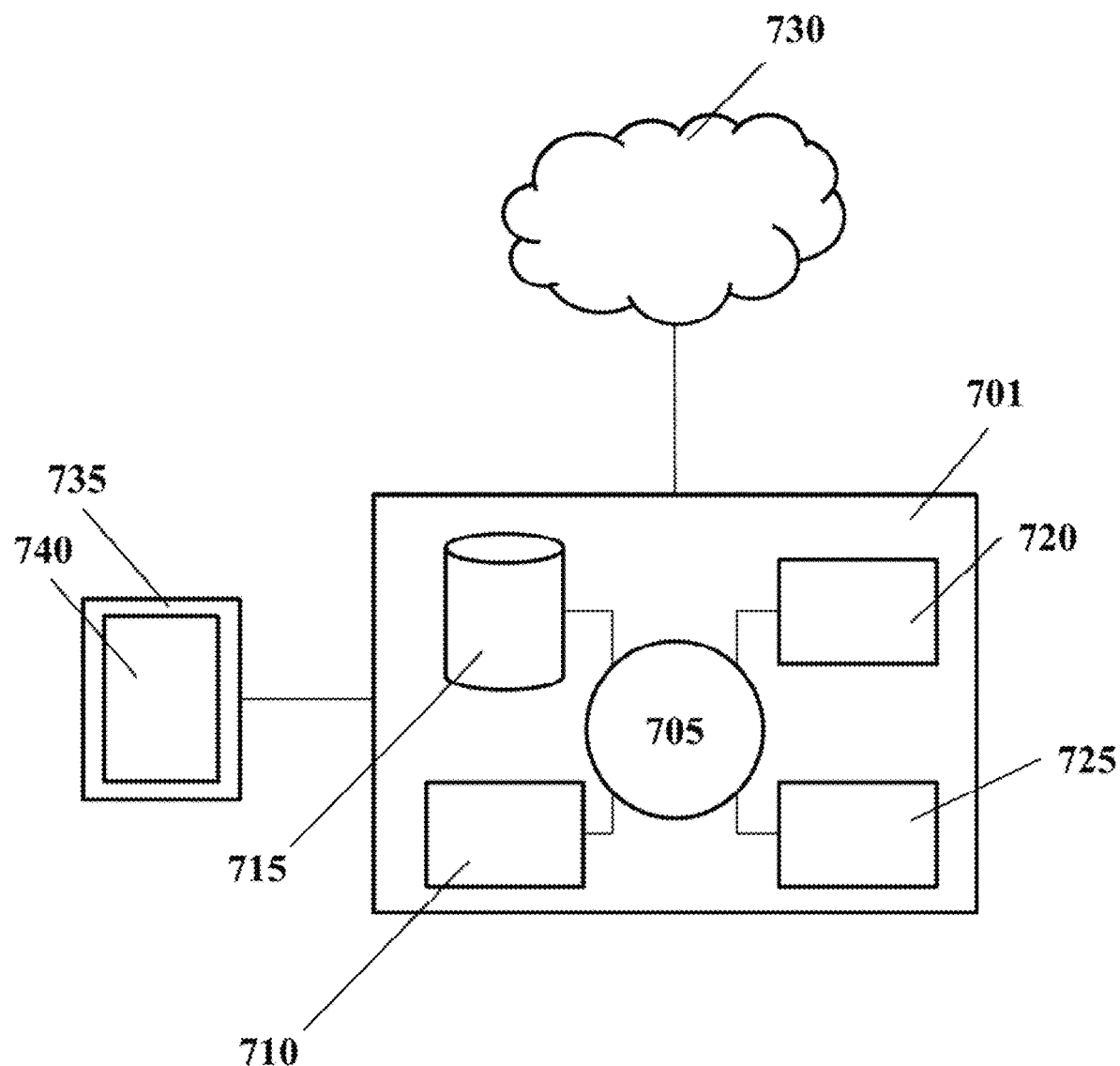
FIG. 7 shows a computer system that is programmed or otherwise configured to implement methods provided herein.

The present disclosure provides computer systems that are programmed to implement methods of the disclosure. FIG. 7 shows a computer system 701 that is programmed or otherwise configured to implement methods provided herein.

The computer system 701 can regulate various aspects of the present disclosure, such as, for example, obtaining an inventory dataset comprising a plurality of inventory variables, applying a trained algorithm to the inventory dataset to generate a prediction of the variables having future uncertainty, and applying an optimization algorithm to the inventory dataset to optimize the plurality of inventory variables. The computer system 701 can be an electronic device of a user or a computer system that is remotely located with respect to the electronic device. The electronic device can be a mobile electronic device.

The computer system 701 includes a central processing unit (CPU, also "processor" and "computer processor" herein) 705, which can be a single core or multi core processor, or a plurality of processors for parallel processing. The computer system 701 also includes memory or memory location 710 (e.g., random-access memory, read-only memory, flash memory), electronic storage unit 715 (e.g., hard disk), communication interface 720 (e.g., network adapter) for communicating with one or more other systems, and peripheral devices 725, such as cache, other memory, data storage and/or electronic display adapters. The memory 710, storage unit 715, interface 720 and peripheral devices 725 are in communication with the CPU 705 through a communication bus (solid lines), such as a motherboard. The storage unit 715 can be a data storage unit (or data repository) for storing data. The computer system 701 can be operatively coupled to a computer network ("network") 730 with the aid of the communication interface 720. The network 730 can be the Internet, an internet and/or extranet, or an intranet and/or extranet that is in communication with the Internet.

The network 730 in some cases is a telecommunication and/or data network. The network 730 can include one or more computer servers, which can enable distributed computing, such as cloud computing. For example, one or more computer servers may enable cloud computing over the network 730 ("the cloud") to perform various aspects of analysis, calculation, and generation of the present disclosure, such as, for example, obtaining an inventory dataset comprising a plurality of inventory variables, applying a trained algorithm to the inventory dataset to generate a prediction of the variables having future uncertainty, and applying an optimization algorithm to the inventory dataset to optimize the plurality of inventory variables. Such cloud computing may be provided by cloud computing platforms such as, for example, Amazon Web Services (AWS), Microsoft Azure, Google Cloud Platform, and IBM cloud. The network 730, in some cases with the aid of the computer system 701, can implement a peer-to-peer network, which may enable devices coupled to the computer system 701 to behave as a client or a server.

The CPU 705 can execute a sequence of machine-readable instructions, which can be embodied in a program or software. The instructions may be stored in a memory location, such as the memory 710. The instructions can be directed to the CPU 705, which can subsequently program or otherwise configure the CPU 705 to implement methods of the present disclosure. Examples of operations performed by the CPU 705 can include fetch, decode, execute, and writeback.

The CPU 705 can be part of a circuit, such as an integrated circuit. One or more other components of the system 701 can be included in the circuit. In some cases, the circuit is an application specific integrated circuit (ASIC).

The storage unit 715 can store files, such as drivers, libraries and saved programs. The storage unit 715 can store user data, e.g., user preferences and user programs. The computer system 701 in some cases can include one or more additional data storage units that are external to the computer system 701, such as located on a remote server that is in communication with the computer system 701 through an intranet or the Internet.

The computer system 701 can communicate with one or more remote computer systems through the network 730. For instance, the computer system 701 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 701 via the network 730.

Methods as described herein can be implemented by way of machine (e.g., computer processor) executable code stored on an electronic storage location of the computer system 701, such as, for example, on the memory 710 or electronic storage unit 715. The machine executable or machine readable code can be provided in the form of software. During use, the code can be executed by the processor 705. In some cases, the code can be retrieved from the storage unit 715 and stored on the memory 710 for ready access by the processor 705. In some situations, the electronic storage unit 715 can be precluded, and machine-executable instructions are stored on memory 710.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 701, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 701 can include or be in communication with an electronic display 735 that comprises a user interface (UI) 740. Examples of user interfaces (UIs) include, without limitation, a graphical user interface (GUI) and web-based user interface. For example, the computer system can include a web-based dashboard (e.g., a GUI) configured to display, for example, a BOM to a user.

Methods and systems of the present disclosure can be implemented by way of one or more algorithms. An algorithm can be implemented by way of software upon execution by the central processing unit 705. The algorithm can, for example, obtain an inventory dataset comprising a plurality of inventory variables, apply a trained algorithm to the inventory dataset to generate a prediction of the variables having future uncertainty, and apply an optimization algorithm to the inventory dataset to optimize the plurality of inventory variables.

Although the description has been described with respect to particular embodiments thereof, these particular embodiments are merely illustrative, and not restrictive. Concepts illustrated in the examples may be applied to other examples and implementations.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A system comprising one or more computer processors and one or more storage devices having instructions stored thereon that are operable, when executed by the one or more computer processors, to cause the one or more computer processors to:

receive an inventory dataset comprising a plurality of inventory variables that indicate at least historical values of inventory variables over time;

apply a prediction module, by the one or more computer processors, to the inventory dataset to generate a prediction dataset comprising statistical distributions of the plurality of inventory variables having one or more future uncertainty levels, wherein the prediction module comprises a trained machine learning model that is trained with the historical values of the plurality of inventory variables;

apply an optimization module, by the one or more computer processors, to the prediction dataset, to determine future target levels for the one or more future uncertainty levels of the plurality of inventory variables for one or more constraint conditions, wherein the optimization module applies a stochastic constrained optimization algorithm to the plurality of inventory variables based on the one or more constraint conditions; and continually update the trained machine learning model using current values of the plurality of inventory variables.

2. The system of claim 1, wherein the instructions are operable, when executed by the one or more computer processors, to cause the one or more computer processors to further:
obtain the current values of the plurality of inventory variables, wherein the current values comprise a current inventory level and a quantity of current supplier orders; and
apply the optimization module to at least the current inventory level and the quantity of current supplier orders to determine future target inventory levels.

3. The system of claim 2, wherein the instructions are operable, when executed by the one or more computer processors, to cause the one or more computer processors to further:
generate an inventory management recommendation based on the determined future target inventory levels.

4. The system of claim 3, wherein the current values of the plurality of inventory variables comprise a current inventory level, and wherein the inventory management recommendation comprises a recommendation to reduce or increase the current inventory level.

5. The system of claim 3, wherein the inventory management recommendation is generated in real time.

6. The system of claim 1, wherein the instructions are operable, when executed by the one or more computer processors, to cause the one or more computer processors to further:
determine a present demand requirement, an incoming demand requirement, or an expected demand requirement using a forecasted demand for finished products and a bill of materials (BOM) for the finished products.

7. The system of claim 6, wherein the BOM comprises a dynamic hierarchical graph.

8. The system of claim 1, wherein the instructions are operable, when executed by the one or more computer processors, to cause the one or more computer processors to further apply an aggregation module to obtain and aggregate datasets from a plurality of disparate sources, wherein the datasets are persisted in a plurality of data stores, wherein the plurality of disparate sources comprises one or more internal datasets and one or more external datasets, thereby generating the inventory dataset.

9. The system of claim 8, wherein the plurality of disparate sources comprises at least one of smart devices, sensors, enterprise systems, extraprise, and Internet sources.

10. The system of claim 1, wherein the plurality of inventory variables comprises at least one of arrival movements, consumption movements, blocked movements, and inter-factory movements.

11. The system of claim 1, wherein the plurality of inventory variables comprises at least one of a demand forecast, material consumption, transit time, and shipping cost.

12. The system of claim 1, wherein the trained machine learning model comprises at least one of a support vector machine (SVM), a naïve Bayes classification, a linear regression, a logistic regression, a random forest, and a neural network.

13. The system of claim 1, wherein the statistical distributions of the plurality of inventory variables having one or more future uncertainty levels comprise one or more statistical parameters.

14. The system of claim 13, wherein the one or more statistical parameters comprise at least one of a median, a mean, a mode, a variance, a standard deviation, a quantile, a measure of central tendency, a measure of variance, a range, a minimum, a maximum, an interquartile range, and a percentile.

15. The system of claim 1, wherein the statistical distributions of the plurality of inventory variables having one or more future uncertainty levels comprise at least one of a Gaussian distribution, a Gamma distribution, and a Poisson distribution.

16. The system of claim 1, wherein the one or more constraint conditions comprise at least one of an inventory constraint, a service level constraint, an arrival window constraint, an order size constraint, and an ordering window constraint.

17. The system of claim 1, wherein the stochastic constrained optimization algorithm comprises at least one of a grid search, a random search, and a Bayesian optimization search.

18. The system of claim 1, wherein the stochastic constrained optimization algorithm further performs single-echelon inventory optimization, wherein the inventory dataset comprises a plurality of inventory variables for a single-echelon inventory, and wherein the single-echelon inventory corresponds to a single node or facility.

19. The system of claim 1, wherein the stochastic constrained optimization algorithm further performs multi-echelon inventory optimization, wherein the inventory dataset comprises a plurality of inventory variables for a multi-echelon inventory, and wherein the multi-echelon inventory corresponds to a supply chain network comprising a plurality of nodes or facilities.

20. The system of claim 19, wherein the stochastic constrained optimization algorithm models the plurality of inventory variables using a probabilistic graphical model of a supply chain network.

21. The system of claim 19, wherein the stochastic constrained optimization algorithm models the plurality of inventory variables using a Bayesian optimization model of a supply chain network.

22. The system of claim 1, wherein the plurality of inventory variables comprise at least historical values of (i) inventory levels, (ii) inventory holding costs, (iii) supplier orders, or (iv) lead times over time.

23. The system of claim 1, wherein the one or more constraint conditions require a future target inventory level to satisfy at least one of a present demand requirement, an incoming demand requirement, and an expected demand requirement.

24. The system of claim 1, wherein the one or more future uncertainty levels comprise at least one of uncertainty over time in inventory levels, inventory holding costs, supplier orders, and lead times.

25. The system of claim 1, wherein the one or more future uncertainty levels are associated with different identifiable item types.

26. The system of claim 25, wherein the future target levels further comprise one or more reorder parameters of the different identifiable item types with associated future uncertainty levels, and wherein the instructions are operable, when executed by the one or more computer processors, to cause the one or more computer processors to further:
generate a probabilistic graphical model based on the future target levels comprising the one or more reorder parameters of the different identifiable item types.

27. The system of claim 1, wherein the determined future target levels for the one or more future uncertainty levels of the plurality of inventory variables minimizes a future inventory holding cost.

28. The system of claim 1, wherein the stochastic constrained optimization algorithm comprises a mixed integer linear programming (MILP) problem, and wherein the stochastic constrained optimization algorithm performs multi-echelon inventory optimization (MEIO).

29. A computer-implemented method comprising:
receiving an inventory dataset comprising a plurality of inventory variables that indicate at least historical values of inventory variables over time;
applying a prediction module to the inventory dataset to generate a prediction dataset comprising statistical distributions of the plurality of inventory variables having one or more future uncertainty levels, wherein the prediction module comprises a trained machine learning model that is trained with the historical values of the plurality of inventory variables;
applying an optimization module to the prediction dataset, to determine future target levels for the one or more future uncertainty levels of the plurality of inventory variables for one or more constraint conditions, wherein the optimization module applies a stochastic constrained optimization algorithm to the plurality of inventory variables based on the one or more constraint conditions; and
continually updating the trained machine learning model using current values of the plurality of inventory variables.

30. The computer-implemented method of claim 29, further comprising:
obtaining the current values of the plurality of inventory variables, wherein the current values comprise a current inventory level and a quantity of current supplier orders; and
applying the optimization module to at least the current inventory level and the quantity of current supplier orders to determine future target inventory levels.

31. The computer-implemented method of claim 30, further comprising generating an inventory management recommendation based on the determined future target inventory levels.

32. The computer-implemented method of claim 31, wherein the current values of the plurality of inventory variables comprise a current inventory level, and wherein the inventory management recommendation comprises a recommendation to reduce or increase the current inventory level.

33. The mcomputer-implemented ethod of claim 31, wherein the inventory management recommendation is generated in real time.

34. The computer-implemented method of claim 29, further comprising determining a present demand requirement, an incoming demand requirement, or an expected demand requirement using a forecasted demand for finished products and a bill of materials (BOM) for the finished products.

35. The computer-implemented method of claim 34, wherein the BOM comprises a dynamic hierarchical graph.

36. The computer-implemented method of claim 29, further comprising applying an aggregation module to obtain and aggregate datasets from a plurality of disparate sources, wherein the datasets are persisted in a plurality of data stores, wherein the plurality of disparate sources comprises one or more internal datasets and one or more external datasets, thereby generating the inventory dataset.

37. The computer-implemented method of claim 36, wherein the plurality of disparate sources comprises at least one of smart devices, sensors, enterprise systems, extraprise, and Internet sources.

38. The computer-implemented method of claim 29, wherein the plurality of inventory variables comprises at least one of arrival movements, consumption movements, blocked movements, and inter-factory movements.

39. The computer-implemented method of claim 29, wherein the plurality of inventory variables comprises at least one of a demand forecast, material consumption, transit time, and shipping cost.

40. The computer-implemented method of claim 29, wherein the trained machine learning model comprises at least one of a support vector machine (SVM), a naïve Bayes classification, a linear regression, a logistic regression, a random forest, and a neural network.

41. The computer-implemented method of claim 29, wherein the statistical distributions of the plurality of inventory variables having one or more future uncertainty levels comprise one or more statistical parameters.

42. The computer-implemented method of claim 41, wherein the one or more statistical parameters comprise at least one of a median, a mean, a mode, a variance, a standard deviation, a quantile, a measure of central tendency, a measure of variance, a range, a minimum, a maximum, an interquartile range, and a percentile.

43. The computer-implemented method of claim 29, wherein the statistical distributions of the plurality of inventory variables having one or more future uncertainty levels comprise at least one of a Gaussian distribution, a Gamma distribution, and a Poisson distribution.

44. The computer-implemented method of claim 29, wherein the one or more constraint conditions comprise at least one of an inventory constraint, a service level constraint, an arrival window constraint, an order size constraint, and an ordering window constraint.

45. The computer-implemented method of claim 29, wherein the stochastic constrained optimization algorithm comprises at least one of a grid search, a random search, and a Bayesian optimization search.

46. The computer-implemented method of claim 29, wherein the stochastic constrained optimization algorithm further performs single-echelon inventory optimization, wherein the inventory dataset comprises a plurality of inventory variables for a single-echelon inventory, and wherein the single-echelon inventory corresponds to a single node or facility.

47. The computer-implemented method of claim 29, wherein the stochastic constrained optimization algorithm further performs multi-echelon inventory optimization, wherein the inventory dataset comprises a plurality of inventory variables for a multi-echelon inventory, and wherein the multi-echelon inventory corresponds to a supply chain network comprising a plurality of nodes or facilities.

48. The computer-implemented method of claim 47, wherein the stochastic constrained optimization algorithm models the plurality of inventory variables using a probabilistic graphical model of a supply chain network.

49. The computer-implemented method of claim 47, wherein the stochastic constrained optimization algorithm models the plurality of inventory variables using a Bayesian optimization model of a supply chain network.

50. The computer-implemented method of claim 29, wherein the plurality of inventory variables comprise at least historical values of (i) inventory levels, (ii) inventory holding costs, (iii) supplier orders, or (iv) lead times over time.

51. The computer-implemented method of claim 29, wherein the one or more constraint conditions require a future target inventory level to satisfy at least one of a present demand requirement, an incoming demand requirement, and an expected demand requirement.

52. The computer-implemented method of claim 29, wherein the one or more future uncertainty levels comprise at least one of uncertainty over time in inventory levels, inventory holding costs, supplier orders, and lead times.

53. The computer-implemented method of claim 29, wherein the one or more future uncertainty levels are associated with different identifiable item types.

54. The computer-implemented method of claim 53, wherein the future target levels further comprise one or more reorder parameters of the different identifiable item types with associated future uncertainty levels, and
  wherein the computer-implemented method further comprises generating a probabilistic graphical model based on the future target levels comprising the one or more reorder parameters of the different identifiable item types.

55. The computer-implemented method of claim 29, wherein the determined future target levels for the one or more future uncertainty levels of the plurality of inventory variables minimizes a future inventory holding cost.

56. The computer-implemented method of claim 29, wherein the stochastic constrained optimization algorithm comprises a mixed integer linear programming (MILP) problem, and wherein the stochastic constrained optimization algorithm performs multi-echelon inventory optimization (MEIO).

57. A non-transitory computer storage medium storing instructions that are operable, when executed by one or more computer processors, to cause the one or more computer processors to:
  receive an inventory dataset comprising a plurality of inventory variables that indicate at least historical values of inventory variables over time;
  apply a prediction module to the inventory dataset to generate a prediction dataset comprising statistical distributions of the plurality of inventory variables having one or more future uncertainty levels, wherein the prediction module comprises a trained machine learning model that is trained with the historical values of the plurality of inventory variables;
  apply an optimization module to the prediction dataset, to determine future target levels for the one or more future uncertainty levels of the plurality of inventory variables for one or more constraint conditions, wherein the optimization module applies a stochastic constrained optimization algorithm to the plurality of inventory variables based on the one or more constraint conditions; and
  continually update the trained machine learning model using current values of the plurality of inventory variables.

58. The non-transitory computer storage medium of claim 57, wherein the instructions are operable, when executed by the one or more computer processors, to cause the one or more computer processors to further:
  obtain the current values of the plurality of inventory variables, wherein the current values comprise a current inventory level and a quantity of current supplier orders; and
  apply the optimization module to at least the current inventory level and the quantity of current supplier orders to determine future target inventory level.

59. The non-transitory computer storage medium of claim 57, wherein the one or more future uncertainty levels are associated with different identifiable item types.

60. The non-transitory computer storage medium of claim 59, wherein the future target levels further comprise one or more reorder parameters of the different identifiable item types with associated future uncertainty levels, wherein the instructions are operable, when executed by the one or more computer processors, to cause the one or more computer processors to further:
  generate a probabilistic graphical model based on the future target levels comprising the one or more reorder parameters of the different identifiable item types.

* * * * *

UNITED STATES PATENT AND TRADEMARK OFFICE
CERTIFICATE OF CORRECTION

| | |
|---|---|
| PATENT NO. | : 11,620,612 B2 |
| APPLICATION NO. | : 16/506672 |
| DATED | : April 4, 2023 |
| INVENTOR(S) | : Henrik Ohlsson et al. |

It is certified that error appears in the above-identified patent and that said Letters Patent is hereby corrected as shown below:

In the Claims

At Column 23, Claim number 33, Line number 51, delete "mcomputer-implemented ethod" and replace with --computer-implemented method--.

Signed and Sealed this
Twenty-third Day of May, 2023

Katherine Kelly Vidal
*Director of the United States Patent and Trademark Office*